United States Patent [19]

Talkowski

[11] Patent Number: 5,587,430
[45] Date of Patent: Dec. 24, 1996

[54] ETHYLENE-ACID COPOLYMER AND IONOMER BLENDS HAVING IMPROVED HIGH TEMPERATURE PROPERTIES AND PROCESSIBILITY

[75] Inventor: Charles J. Talkowski, Hockessin, Del.

[73] Assignee: E. I. Du Pont de Nemours and Company, Wilmington, Del.

[21] Appl. No.: 575,804

[22] Filed: Dec. 22, 1995

Related U.S. Application Data

[63] Continuation-in-part of Ser. No. 536,403, Sep. 29, 1995, abandoned.

[51] Int. Cl.[6] .................................................. C08L 23/26
[52] U.S. Cl. ............................................ 525/196; 525/221
[58] Field of Search ..................................... 525/196, 221

[56] References Cited

U.S. PATENT DOCUMENTS

| | | | |
|---|---|---|---|
| 4,248,990 | 2/1981 | Pieski et al. | 526/317 |
| 4,911,451 | 3/1990 | Sullivan | 273/235 R |
| 5,000,459 | 3/1991 | Isaac | 273/235 R |
| 5,298,571 | 3/1994 | Statz | 525/330.2 |
| 5,328,959 | 7/1994 | Sullivan | 525/196 |
| 5,397,840 | 3/1995 | Sullivan et al. | 525/221 |
| 5,415,937 | 5/1995 | Cadorniga | 428/407 |

*Primary Examiner*—Vasu S. Jagannathan
*Attorney, Agent, or Firm*—Peter A. Fowell

[57] ABSTRACT

Ionomeric compositions which are blends of a first ethylene/acid copolymer polymerized at low temperatures and normal pressures, and a highly neutralized second ethylene/acid copolymer, polymerized at normal polymerization temperatures and pressures but having a high melt index, above 80 g/10 min., in the parent acid copolymer and also a high melt index, above 3.0 g/10 min., in the resulting neutralized ionomer, have both improved high temperature mechanical properties and improved melt processability. Alternatively, the first and second acid copolymers may be blended and neutralized in the same melt process step, or first melt blended, and then neutralized in a subsequent melt process step.

7 Claims, No Drawings

ETHYLENE-ACID COPOLYMER AND IONOMER BLENDS HAVING IMPROVED HIGH TEMPERATURE PROPERTIES AND PROCESSIBILITY

This is a continuation-in-part of application Ser. No. 08/536,403, filed Sep. 29, 1995, now abandoned.

BACKGROUND OF THE INVENTION

1. Field of the Invention

This invention relates to ionomer compositions with improved high temperature utility compared with standard ionomers. The compositions are blends of two substantially different ethylene/carboxylic acid copolymers or derived ionomers. The blend components are, or derive from, ethylene/carboxylic acid copolymers prepped under markedly different polymerization conditions, and also, preferably, different acid levels.

2. Description of Related Art

Copolymers of ethylene and an unsaturated carboxylic acid such as (meth)acrylic acid, optionally with another comonomer, and their derived ionomers are well known. These copolymers typically contain at least 50 weight percent and up m about 95 weight percent ethylene. Not unexpectedly, they have some characteristics which reflect crystallinity somewhat similar to that of polyethylene. The polar acid groups in such acid copolymers lead differences from, and certain advantages, as well as some disadvantages compared with polyethylene itself. When the acid copolymers are neutralized, the resulting ionomers contain ionic bonds which lead to an additional difference, and some advantages over the acid copolymer itself. Ionomers contain effective crosslinking at use temperatures, yet thermoplastic processibility at melt temperatures. Ionomer properties thus display characteristics which reflect a crosslinked nature, and an ionic nature. Ionomers have higher tensile strength, greater clarity, better abrasion resistance and higher stiffness than acid copolymers with comparable melt index (MI) and comonomer level.

The higher the acid level, the higher the degree of ionic character possible, since there are more acid groups to be neutralized with metal cations. Neutralization increases molecular weight (particularly weight-average rather than the underlying number-average chain length) and viscosity. MI decreases on neutralization. Thus the acid copolymers used to make ionomers are polymerized to a much lower molecular weight (higher MI) than typical for acid copolymers (other than those for adhesive use where high MI is the norm), and then neutralized to higher molecular weight (lower MI) via ionic crosslinking. The molecular weight required to achieve good mechanical properties in ionomers is thus achieved, in part, by crosslinking rather than by increasing degree of polymerization per se as is necessary with (un-neutralized) acid copolymers for uses other than for adhesives.

Typically, ionomers are produced from acid copolymers having an MI of 20 to 80 g/10 min. The MI of the neutralized ionomers, for good mechanical properties is typically less than about 3.0 g/10 min. and often less than 1.0 g/10 min. and even as low as 0.1 g/10 min. Acid copolymers themselves with good mechanical properties would also have an MI of 3.0 or even lower. However, an MI below 3.0 g/10 min. for either acid copolymers or ionomers corresponds to a viscosity which can lead to poor processibility.

The interspersed copolymerized acid units however, modify, and may reduce the level of crystallinity compared with polyethylene and, unfortunately, reduce the melting point and upper use temperature to well below that of polyethylene itself. Neutralization generally further reduces the freezing point somewhat and also may reduce the amount of crystallinity. Increasing the use temperature of ionomeric copolymers, while maintaining their essential ionomer character, has become a holy grail. Typical commercial ionomers, such as those sold under the trade name Surlyn® by E. I. du Pont de Nemours and Company, derive from acid copolymers with about 9 to 20 weight percent (meth)acrylic acid comonomer. As normally prepared, both the acid copolymers and their derived ionomers have differential scanning calorimetry (DSC) melting points which are in the region of about 81° to about 96° C. This is considerably below that of low density (branched) polyethylene prepared under generally comparable conditions, which has a melting point of about 115° C. For many uses it would be desirable to have an ionomer with a melting point above 100° C., and as high as 110° C. or even higher.

U.S. Pat. No. 4,248,990 (Pieski), discloses that the polymerization pressure and temperature both have a strong effect on the stiffness of acid copolymers. Pieski considered polymerization at low pressure using 'normal' temperatures, and at low temperature using 'normal' pressures equivalent options to producing the polymers of his invention. When low polymerization temperature alone, i.e., at 'normal' pressures was used the Vicat Softening temperature, stiffness, and tensile yield strength increased dramatically for acid copolymers with about 9 to 15 weight percent methacrylic acid, when polymerization temperature was decreased from 250° to 160° C. The increased softening temperature corresponds to an increase in the melting points. This increased temperature was attributed to a change in the randomness of the acid and ethylene groups along the polymer chain. At the same acid level, an increase in the number of acid diads and triads occurs. This results in less break up of the polyethyene sequences in the polymer for a given acid level, and a higher melting point, nearer that of polyethylene. Pieski discloses, and his data show, that as an alternative to low temperature, low pressure also produces more diads and triads. The two different polymerization conditions were considered alterative modes of producing polymer of his invention.

However, low temperature and low pressure may not at all be equivalent alternatives. Based on analogy with polyethylene polymerization, at lower polymerization temperatures, less short chain branching occurs, and this also contributes to higher crystallinity and higher melting point. By contrast, polymerization at low pressure at normal temperatures produces higher levels of short chain branching and hence lower crystallinity—just the opposite of what is required for high temperature behavior. Interestingly, Pieski's data show only slightly higher stiffness for low pressure polymerization, and softening temperature data are entirely absent. In contrast to Pieski's theories of the all importance of sequence distribution, as a result of the present invention, it is now believed that low branching is at least equally, and probably more important. As a result, low pressure polymerization is specifically excluded in the present invention.

There is, however, a significant decrease in polymer productivity when employing low temperature polymerization. Heat evolved from the polymerization, which will be proportional to the polymerization rate, will determine polymerization temperature for a given monomer feed temperature, when polymerization is run, as it typically is, under largely adiabatic conditions. The temperature difference between feed and polymerization temperature will thus be a measure of polymerization rate. Thus, very generally, for a 40° C. feed, productivity can be reduced by a factor of 120/210, or by about 43 percent when the polymerization temperature is reduced from 250° to 160° C.

A further problem with low temperature polymerization of acid copolymers is that phase separation of monomer and polymer can occur. Normal polymerization conditions of high pressure and high temperature allow polymerization in one phase. Phase separation is also more acute at higher acid levels, even at normal polymerization temperatures, but particularly at low polymerization temperatures. When phase separation occurs, non-uniform polymerization results.

The melting point of ethylene/carboxylic acid copolymers, polymerized at any given temperature, becomes closer to that of polyethylene as the molar amount of acid comonomer copolymerized into the polymer is reduced. For instance, the melting point of acid copolymers polymerized at 250° C. increases about 7° C., from about 94° to 101° C., when the acid content is decreased from about 4 to 2 mole percent, and from about 104° to 111° C. at 180° C. polymerization temperature. (On a weight basis this would correspond to about 13 to 6 weight percent methacrylic acid and about 11 to 5 weight percent acrylic acid). The highest melting point achievable in acid copolymers can be obtained therefore, by a combination of low temperature polymerization and low acid levels. For the derived ionomers however, low acid levels allow development of less ionomer character when neutralized since, with a lower amount of acid to be neutralized, fewer ions can be incorporated.

With regard to improved processibility, recently it has been discovered that ionomers with almost equivalent properties to standard ionomers of MI below about 3.0 g/10 min., but with much better flow, can be obtained when the MI of the parent acid copolymer is as high as 300 g/10 min., rather than the normal 20 to 80 g/10 min., provided they are neutralized to a relatively high degree. Such polymers are neutralized to at least 40%, compared with less than 30% for some standard ionomers. This large MI reduction necessitates parent acid copolymers having relatively high acid levels; about 10 weight percent for methacrylic acid, and preferably above. The final MI of such materials can be much higher than regular ionomers (e.g., as high as 7.0 g/10 min). The higher starting MI allows a higher percent neutralization of acid groups present before a given MI is obtained. In addition, high acid levels allow a higher level of ion incorporation for a given level of neutralization. Naturally, these new ionomers have excellent melt processibility to the extent that processibility is affected by good melt flow. However, melt processibility is not just a function of melt flow, but also of crystallization characteristics.

The concept of blending a low melting point resin with a high melting point resin is well known. Blends of standard ionomers, with their low melting point, with polyethylene with a much higher melting point are, however, somewhat incompatible, and as a result have certain poorer properties including lower melt strength and loss of clarity. While commercial compositions which are blends of ionomer and a major portion of polyethylene (high density) do exist, their properties are substantially different from those being sought here, which are essentially those of a pure ionomer.

Blending different ionomers or ionomers with acid copolymers is also well known, and for typical copolymers which have acid levels of 9 weight percent and above, incompatibility is not a problem. Ions are believed to be significantly labile, so that acid copolymers blended with ionomers produce compositions where the ions are associated with all acid groups present.

Such blending has taken on particular importance in certain end uses such as golf ball materials. Thus, U.S. Pat. No. 5,397,840 (Sullivan et al.) discloses blends of ionomers and acid copolymers for golf ball cover materials. Many similar patents disclose ionomer blends. However, in all these cases, there is no disclosure of blends where the acid copolymers, from which the ionomer components are derived, are prepared under vastly different polymerization conditions, and where at least one blend component has a parent acid copolymer with high MI.

There is a need for ionomers which have good mechanical properties, particularly at higher temperatures, in order to increase end-use temperature, yet which still have excellent or even improved processabilty.

SUMMARY OF THE INVENTION

The invention depends on the recognition that blending certain defined different acid copolymers and ionomers can lead to ionomer compositions with good ambient temperature properties, improved high temperature properties, as well as improved processibility compared with standard ionomers, and without a major overall sacrifice in productivity compared with standard ionomer preparation.

Specifically, the invention is to ionomer compositions, which are comprised of blends of:

a) 30–80 weight percent, based on the blend, of a first ethylene/carboxylic acid copolymer having from 3 to 13 weight percent acrylic or methacrylic acid, prepared at a polymerization temperature of below 200° C., and a polymerization pressure of greater than 23,000 psi, and having a defined DSC melting point above 100° C., and an MI of from about 0.5 to 60 g/10 min, and b) 20 to 70 weight percent, based on the blend, of an ionomer which is prepared from a second ethylene/carboxylic acid copolymer having from 9 to 25 weight percent acrylic or methacrylic acid, and optionally up to 40 weight percent of an alkyl acrylate, prepared at a polymerization temperature of above 200° C., and a polymerization pressure greater than 23,000 psi, the second acid copolymer having an MI of from 80 to 300 g/10 min, by partially neutralizing, from about 40 to 80% of the acid groups with zinc, sodium, lithium or magnesium ions, the ionomer having an MI of from about 3.0 to about 7.0 g/10 min, the level of neutralization of all acid groups in the blend composition being at least 25%, and the MI of the blend being from about 7.0 to about 1.5 g/10 min.

In another aspect of the invention, acid copolymer a), and the acid copolymer of b) may be melt blended either before or at the same time as neutralizing in melt mixing equipment.

DETAILED DESCRIPTION OF THE INVENTION

In this disclosure, the term 'copolymer' means a polymer derived from two or more monomers. 'Dipolymers' and 'terpolymers' are copolymers with two and three monomers respectively. The term 'direct copolymer' means a copolymer where the monomers are polymerized together, producing polymer with quasi-random sequence distribution of monomers along the chain, but in accord with the monomer reactivities at the polymerization temperature. This is in contrast to 'graft' copolymers where one or more 'comonomers' may be grafted onto a main chain polymer, the comonomer thus producing long sequences of units.

Methods of preparing acid copolymers and ionomers are well known. Acid copolymers may be prepared by the method disclosed in U.S. Pat. No. 4,351,93 1 (Armitage). This patent describes polymers with up to 90 weight percent ethylene, the rest being a carboxylic acid. This represents a general procedure for preparation of all acid copolymers within the bounds of this invention.

U.S. Pat. No. 5,028,674 (Hatch et al.) discloses improved methods of polymerizing such copolymers when polar monomers such as acrylic and methacrylic acid are incorporated particularly at a level of higher than 10 weight percent.

U.S. Pat. No. 4,248,990 (Pieski) describes preparation and properties of acid copolymers at low polymerization temperatures and normal temperatures, as well as low pressures and normal temperatures. The latter conditions are not used for the polymers of the present invention. Preparation is exemplified when the polymerization temperature is as low as 160° C. but also up to 250° C. at normal pressures and these conditions are those used for preparation of polymers of the present invention. All the above three patents are hereby incorporated by reference.

The preparation of ionomers from acid copolymers is disclosed in U.S. Pat. No. 3,264,272 (Rees). This is a broad disclosure describing preparation when the starting MI is up to as high as 1000 g/10 min, and the finishing MI may be as low as about 0.1. It embraces the preparation of all ionomers of this invention. The patent is hereby incorporated by reference.

The composition of this invention has, as a first component, a first acid copolymer which is a direct ethylene/ unsaturated carboxylic acid copolymer with from 3 to 13 weight percent acrylic acid or methacrylic acid as that acid comonomer, polymerized at a temperature of below 200° C. Polymerization pressure must be above 23,000 psi and can be as high as 30,000 psi. This is referred to in this disclosure as 'normal' polymerization pressure. Low pressures of below 23,000 psi, which are part of Pieski's polymerization conditions are specifically excluded conditions in the preparation of polymers of the present invention. The copolymer must have a melting point as determined by differential scanning calorimetry (DSC) of above 100° C. DSC techniques vary somewhat, and result in slightly different values of melting point, so that the method must be precisely defined. The method described under 'Test Procedures' defines the method used. There may be from 30 to 80 weight percent of this first acid copolymer component in the blend.

If the amount of carboxylic acid is below 3 weight percent, the polymer has a high melting point, but becomes too polyethylene-like, and insufficiently compatible with the second component of the blend to give the desired ionomer-type properties. If the amount is above 13 percent, the melting point will still be increased, but to a lesser extent, and its use in the blends of this invention will have less effect. In order to give the most preferred high melting point, the amount of carboxylic acid is preferably below 8 weight percent and most preferably below 6 weight percent. Preferably the polymerization temperature is below 190 deg. C., and most preferably below 180° C. For very low polymerization temperatures of below 170° C., slightly higher amounts of acid than the preferred level can provide comparable preferred high melting points to higher polymerization temperature polymers with less acid.

Acrylic acid is preferred over methacrylic acid because it provides an even further preferred distribution of comonomer, disrupting polyethylene sequences less at a comparable molar amount. In addition, cost considerations make it the preferred acid.

It is readily within the skill of the artisan to determine whether a specific combination of a given amount of a given acid, within the limits allowable, will give the required melting point of above 100° C. Within the limits of acid content allowable, there can be some advantages to higher acid, since the polymer will be somewhat more compatible with the ionomer which generally is based on an acid copolymer with higher acid. Thus the polymer blend will have lower haze. Thus, within the possible ranges, there is some degree of choice depending on which particular property is most desired for a particular use.

The higher the melting point, and the higher the amount of the first component in the blend, the greater the advantages with respect to high temperature behavior will be manifest. The higher crystallization temperature component also leads to certain processability advantages, as will be seen below. Below 30 weight percent of the acid copolymer, the effect of the high melting point on improving moldability is not sufficient. Above 80 weight percent, the poorer economics of low temperature polymerization will make the blend unattractive economically. In addition, there will be insufficient ionomer character to the blend when the level of acid in the first acid copolymer component is too low. Preferably, there will be from 40 to 75 weight percent of the first component in the blend.

The melt index of the first acid copolymer may be anywhere between 0.5 and 60 g/10 min. When the weight percent acid is at the most preferred level of below 6.0 weight percent however, the MI will preferably be below about 8 g/10 min., and most preferably below about 4 g/10 min., though higher MIs are not excluded. Acid copolymers with MIs of from 8 to 60 g/10 min. can have poorer mechanical properties, but when blended with ionomer, provided the overall level of neutralization is above 25%, but preferably above 30%, the blend will have acceptable mechanical properties. When the acid level in an acid copolymer is below the acceptable limit, and the MI is higher than the acceptable limit, neutralization can not increase molecular weight sufficiently to give adequate properties either alone or in a blend. Thus an acid copolymer with less than 3 weight percent acid and higher than 60 MI, if neutralization to less than 25%, many chains will remain relatively low in molecular weight, and mechanical properties of a blend will be adversely affected and will have minimal ionomer character.

At lower MIs, the mechanical properties of the first component are better, and this will be reflected in the blend composition. On the other hand, with a higher MI level, there will be a processability advantage, because of the lower viscosity it will provide to the blend for any given second component. Generally however, the second component is relied on to improve melt flow. Although the melt flow of the two components overlap, it is preferable for the MI of the second component ionomer to be higher than that of the first acid copolymer first component. This is particularly true when the first acid copolymer has less than 6 weight percent acid.

The melt index of the final ionomeric blend composition may be from about 1.5 to 7 g/10 min. If the blend MI is above 7 g/10 min., properties suffer. If the MI is below 1.5 g/10 min processability will suffer because of poor flow, and poor processing can often lead to poorer properties than is inherent in the composition.

As indicated above, processability is a function of both the MI of the blend and the crystallization behavior or the blend. The MI of the blend is preferably above 3.0 g/10 min. However, because there is an advantage resulting from the effect of the higher melting point of the first component, even blends with MI between 3.0 and 1.5 g/10 min. will show a processability advantage compared with standard ionomers of the same MI, merely as a result of the crystallization behavior.

The components may be blended in any melt mixing equipment. Preferably they are blended in a melt-extruder, under normal to high shear, at melt temperatures of from about 170° to about 265° C.

When acid copolymer and ionomer are mixed at melt temperatures, the ions of the ionomer are believed to be sufficiently labile that they become associated with all the acid groups in the polymer blend, so that 'pure' acid copolymer, as such, does not exist in the blend. However, the ions may not be completely randomly distributed (i.e., randomly associated among all acid groups present). This will depend to some extent on the intensity of mixing during blending, and may also depend on the precise level of compatibility between acid copolymer and ionomer. Very low acid, acid copolymers and very high acid copolymer based ionomers will be less compatible than when the two components have more similar acid levels. Because the final composition will be, in effect, an ionomer (or an ionomer mix having two different acid copolymer bases), it is not critical that the acid copolymer of the first component be totally free of ions. In fact, it may be partially neutralized. However, since the acid level in the first acid copolymer will generally be lower than that in the second acid copolymer and its derived ionomer, and since neutralization of this first component is neither efficient nor necessary as a means of introducing ions, there is little advantage to neutralizing it before blending. Neutralization of one component i.e., the second acid copolymer, is sufficient. However, partial neutralization, even of this first component, prior to blending with ionomer, is not excluded.

As the prior art discloses, ionomers are typically made by melt blending acid copolymer with a metal ion source, such as a metal salt or oxide. The components of the present invention are melt blended. Therefore, it is possible to combine the two steps, by melt blending the first and second acid copolymer at the same time as neutralization is effected, simply by melt blending the two acid copolymers with the metal ion source, so that only one melt step (combined blending and neutralization) is required. It is even possible to melt blend the acid copolymers and, in a subsequent melt process, neutralize that blend, but that would require two melt steps. The preferred components to be blended are low temperature acid copolymer and high-flow ionomer. While this means that a separate neutralization step from the melt blending step is required, there can be an advantage in that the two components will have known MIs before blending, leading to more predicatable final MI. When two different acid copolymers and a metal ion source are blended/reacted at the same time, the final MI may be more subject to variation. Of course, when the second component, the high flow ionomers, are readily available because they possess utility for purposes other than in the present invention (which is in fact the case), the need to combine blending and neutralization in one step for economic reasons is considerably reduced, since separate neutralization is required anyway.

The second acid copolymer which is, or preferably which forms the base for, the second component of the blend is a direct copolymer which has overlapping, but generally higher levels of acrylic or methacrylic acid. The acid level is from about 9 to about 25 weight percent, preferably 12 to 20 weight percent. This compares with about 3 to 13 weight percent for the first acid copolymer. While it is possible for the acid level of the first acid copolymer to be above that of the second acid copolymer, it is preferable for the acid level in the first acid copolymer to be lower, and most preferably considerably lower than that of the second acid copolymer. Preferably the second acid copolymer has at least 5 weight percent more acid than the second acid copolymer, and most preferably 7 weight percent more acid. In this way, preparative ease of the first acid copolymer and its high temperature contributing behavior, as well as the ability to achieve high levels of ionization of the second acid copolymer in making its ionomer, are all optimized.

When already prepared ionomer is the second component, the level of neutralization is from about 40 to about 80 weight percent. The lower level of 40% is higher than the level normally disclosed as the lower level required for ionomers, which is 10%. This is, in part, because the ions are also required to provide neutralization of the first acid copolymer when the blend is prepared (unless this has been already partially neutralized). The overall level of acid group neutralization in the blend is, therefore, lower than that in the ionomer. It is important for the final blend composition to have ionomer character. Preferably, the level of neutralization in the second component is at least 45 percent. Most preferably it is at least 50 percent. The level of neutralization of the final blend is at least about 25 percent, preferably at least 30 percent, more preferably above 35 percent and most preferably above 45 percent.

When already prepared ionomer is the second component, such an ionomer is a high-flow ionomer. As a blend component it not only provides the ions to the blend, it provides good flow to the blend. It has an MI from 3.0 to 7.0 g/10 min. Typically, though not exclusively, ionomers have MIs of less than 3.0, corresponding to relatively high molecular weight in order to provide excellent mechanical properties. As previously noted, it has been found that, contrary to normal ionomers where the starting acid copolymer MI is generally in the 20 to 80 g/10 min. range, if the starting MI is higher—above 80 and as high as 300 g/10 min.—provided the level of neutralization is above 40 percent and the final MI is in the 3.0 to 7.0 g/10 min. range, mechanical properties can be excellent. If neutralization is effected at the same time as blending the first and second acid copolymers, the MI of the second acid copolymer has the same range of above 80 to 300 g/10 min. Only the MI of the final blend composition will have significance in this case, since no separate second component ionomer is identifyable.

The level (percent) of neutralization needed for a given final MI will increase with increasing MI of the starting acid copolymer. The number of ions incorporated for a given level of neutralization will obviously increase with the amount of acid comonomer in the parent acid copolymer. Thus for a high level of ion incorporation, high acid copolymers with higher MI are preferred as the parent second acid copolymer. For methacrylic acid, preferably the acid level is above 11 weight percent, and most preferably above 13 weight percent. For acrylic acid, lower weight percent levels corresponding to comparable mole percent acid will be the corresponding preferred levels. As the MI of the starting material increases however, eventually the underlying molecular weight before ionic crosslinking, corresponding to the underlying length of the polymer chains, will be too low to give good properties at any level of ionic crosslinking. Ionic crosslinking increases some moments of the molecular weight distribution, but it does not increase the underlying chain length sufficiently. For this reason, the preferred range of MI of second acid copolymer is from about 100 to about 250 g/10 min. and most preferably from about 125 to about 225 g/10 min. The acid copolymer of the second component is prepared at normal polymerization temperatures, that is to say above 200 degrees C. and in accordance with the patents incorporated by reference.

The acid copolymer used as, or preferentially as the base for preparing, the second component, may have up to 40 weight percent softening comonomer. Softening comonomers can improve low temperature toughness of ionomers. However, they also typically reduce the upper use temperature, which is in the opposite direction to that desired in the final compositions. However, because the first acid copolymer can be used to increase the upper use temperature, by virtue of its high melting point, and can be dominating in this respect, it is possible to prepare a blend which has somewhat improved high temperature behavior as well as improved low temperature properties. In general, however, the invention preferably comprises compositions where neither acid copolymer has any softening comonomer units incorporated in it, since it is the achievement of optimum high temperature properties for which this invention is quintessentially useful.

Test Procedures

Melting point, as determined by DSC, is determined as follows. The material is first heated to above its melting point, and to at least 120° C., after which it is cooled in a controlled way, at 10° C./minute to provide a controlled morphology. It is then heated at 10° C./minute. The melting point is the value of the highest temperature peak if there is more than one peak (ionomers generally show two peaks). A cooling exotherm temperature peak, with cooling at 10° C./minute, is also determined, as the maximum point on the cooling curve peak.

Melt Index, MI, is determined using ASTM D-1238, condition E, using a 2160 gram weight.

Rheological measurements were made using a Gottfert 2001 piston rheometer, at the temperature and shear rate indicated.

Tensile properties were carried out at 23° C. and at 95° C., using ASTM D-1708.

Snake Flow tests were carried out using a 6 oz. Van Dorn molding machine. The machine was set up with a 5/32 inch nozzle, a general purpose screw and a 100 mil thick snake flow mold. Ram speed was set at fast and screw rpm was 60. Cycle time was set to give a 15 second injection and a 30 second hold time. The hopper had a nitrogen purge and was at ambient temperature. The rear zone was set at 100° C., the center, front, and nozzle temperatures, the pressure and mold temperature were changed independently of each other to show the affect each had on flow. These temperature and pressure settings are listed in Table 5.

Shear Creep was measured at 25° C. and at 55° C., at 25 and 66 psi, using a TA Corporation 983 Dynamic Mechanical Analyser (DMA), in shear mode. A stress-strain curve at the desired temperatures was measured at the lowest stress level the instrument is capable of measuring which is about 90 psi. The desired stresses of 25 psi and 66 psi are established, assuming the linearity of stress v strain in this range.

A rectangular test sheet, 4×1×12 mm. is mounted between the DMA jaws with a 10 in.-lb. torque force. An initial displacement of 0.05 mm. is set, resulting in an initial stress in the 50–500 psi range. A master-curve for compliance is produced in the following way. Data are obtained using 2000 minute (33 1/3 hr.) duration tests, each test starting at 25° or 55° C. with 5° C. increments, up to 80°–100° C. The temperature is allowed to equilibrate at each step for 30 minutes, followed by creep measurements at the desired stress for 15 minutes, followed by a 60 minute recovery period. The individual compliance curves at different temperatures are then shifted mathematically along the log-(time) axis until they overlap (time/temperature superposition). Creep values (% strain) at 1,100 and 10,000 hours (and other times if desired) are obtained by multiplying the compliance (strain/stress) values read from the master curve at these times by the stress. In the case of more than one stress level tested for a given specimen, isochronous stress-strain curves are plotted and the % total strain at the desired stress level read from the plots.

EXAMPLES

Table 1 lists the various polymers employed in testing. It lists low temperature polymerized acid copolymers as well as an ionomer prepared from one of the low temperature-polymerized acid copolymers. All of these can form the first component of the blend. It then lists high-flow ionomers which can form the second component of the blend, together with two standard ionomers (i.e., not high-flow ionomer, which is defined by the limits of the second component).

Table 2 lists the various compositions tested, giving each an example number. A prefix C indicates materials tested for various comparative purposes, which are outside the invention. Blends within the invention have no prefix letter before the example number.

Table 3 gives mechanical properties of the various examples and comparative examples, if measured. Tensile properties at room temperature and at 95° C. are shown, as well as shear creep measurements at 25° and 55° C., at both 25 and 66 psi pressure. Values are shown after 1, 100 and 10,000 hours.

The tensile properties of standard ionomer are exemplified by example number C7. Note the high (5020 psi) tensile strength at room temperature, but the very low strength (20 psi) at 95° C. The low temperature polymerized acid copolymers C 1 and C2 have much lower tensile strength than the ionomer at room temperature, even when the acid level is 11 weight percent as in C2. This illustrates one of the strengths of ionomers compared with acid copolymers. At 95° C. however, the low acid (5.5%) acid copolymer has excellent tensile properties compared with standard ionomer (810 psi v 20 psi). The higher acid (11%) acid copolymer, C2, is better than standard ionomer, and has a 95° C. tensile strength of 90 psi. When ionomerized, as it would be in a blend however, the tensile strength jumps up to 280 psi (example C3). Example 2 is a blend of the invention, and has higher tensile strength than the acid copolymers at room temperature, though not quite as high as standard ionomer. At 95° C., the blend has a respectable tensile strength of 305 psi.

Creep measurements are shown, which compare blend compositions of the invention (examples 5 and 6) with standard ionomer (C6) and high-flow ionomer (C5). At 25° C., values for the blends are comparable to the ionomers prepared at normal polymerization temperatures. However, at 55° C. the presence of low temperature polymerized acid copolymer in the blend reduced creep dramatically compared with standard and high flow ionomer alone, both at 25 and 66 psi.

Table 4 shows viscosity data for the various materials. Measurements are shown at 190°, 220° and 240° C., at shear rates from 20 to 1000 sec-1. Example C4 shows the low viscosity of the high-flow ionomer at 220° C. compared with standard ionomer, C6. Viscosity values for standard ionomer are also shown at 190° and 240° C. At all temperatures, the blends of the invention have flow comparable to, and generally better than, standard ionomer at shear rates above 400 sec-1, though naturally, not as good as 100 percent high-flow ionomer (220° C. only compared).

Table 5 lists snake flow mold behavior at various temperatures. This is a meaningful processability test, since it combines the effects of melt flow with the effects of crystallization rate at various temperatures. Two sets of barrel temperature profiles were used, and various pressures and mold temperatures. At 60° C. mold temperature standard ionomers and high-flow ionomer could not be molded, due to sprue sticking. Blends of the invention showed no problem when the acid copolymer had 5.5% acid (example 3). The blend with higher acid in the acid copolymer first component showed some problem at 60° C. under one set of molding conditions (B2 condition). However, best flow for both blends was higher than any flow obtainable with standard or even high flow resin under comparable barrel set conditions. Compare under conditions B1 the 18.75 and 18.5 inch flows with a 60° C. mold with the best flow obtainable for control ionomers which was 17.75 for one standard ionomer. Flows were even less for a high flow resin (C5 with 15.87 inch flow) and less again, 11.25, for another standard ionomer. Under barrel condition B2, blend example 3 had a flow of 26 inches at 60° C. mold temperature. Under these barrel conditions, standard resins had much poorer flow, and even high-flow ionomer only had a flow of 23.5 at the highest mold temperature at which it could be molded (40° C.).

Thus, the blend compositions of the invention show both superior mechanical properties, including tensile and creep behavior, as well as at least equal moldability, and at optimum molding conditions, superior moldability.

TABLE 1

| | COPOLYMER BLEND COMPONENTS | | | | | | |
|---|---|---|---|---|---|---|---|
| Polymer | Composition | Weight % | %;Neutr | Poly T. | SMI | MI | DSC mp/cool ex. |
| LTAC1 | E/AA | 94.5/5.5 | None | 180 | 1.3 | 1.3 | 110/95 |
| LTAC2 | E/AA | 89/11 | None | 180 | 27 | 27 | 102/81 |
| LTI1 | E/AA | 89/11 | 40;Zn | 180 | 27 | ? | 101/80 |
| HFI1 | E/MAA | 85/15 | 50;Zn | 230–50 | 210 | 4 | 89/51 |
| HFI2 | E/MAA | 85/15 | 50;Na | 230–50 | 210 | 4 | 88/47 |
| STI1 | E/MAA | 85/15 | 58;Zn | 230–50 | 60 | 0.7 | 89/53.8 |
| STI2 | E/MAA | 85/15 | 59;Na | 230–50 | 60 | 0.9 | 90/46 |

Pol. Temp: Polymerization Temperature
DSC:mp/cool ex: Highest peak melting point on 2nd heat DSC and cooling exotherm temperature peak
E = Ethylene; AA = Acrylic acid
LTAC signifies Low Temperature Polymerized acid copolymer.
LTI signifies Low Temperature Polymerized acid copolymer, neutralized to form ionomer.
HFI signifies High-Flow Ionomer
STI signifies Standard Ionomer
% Neutr,-Percent Neutralization with metal ion shown.
SMI-starting MI for ionomers. MI final MI of acid copolymers (same as starting MI), and for ionomers.

TABLE 2

| | EXAMPLE COMPOSITIONS | | |
|---|---|---|---|
| Ex. # | Composition | Blend Ratio | % Neutralization |
| C1 | LTAC1 | — | 0 |
| C2 | LTAC2 | — | 0 |
| C3 | LTI1 | — | ~40 |
| C4 | HFI1 | — | 50 |
| C5 | HFI2 | — | 50 |
| C6 | STI1 | — | 58 |
| C7 | STI2 | — | 59 |
| 1 | LTAC1/HFI1 | 50/50 | 35.8 |
| 2 | LTAC1/HFI1 | 52.5/47.5 | 35.3 |
| 3 | " | " | 35.3 |
| 4 | LTAC1/HFI2 | 52.5/47.5 | 35.3 |
| 5 | LTAC1/HFI1 | 70/30 | 27.0 |
| 6 | LTAC1/HFI1 | 30/70 | 43.2 |

Compositions of examples 2 and 3 are the same, but prepared at different times, in different equipment
% Neutralization for polymer (measured), or for polymer blend calculated based on % neutralization of components.

TABLE 3

MECHANICAL PROPERTIES OF EXAMPLES

| Ex. # | Tb/Eb 23° | Tb/Eb 95° | % Creep @ 25° C.: 25 psi 1/100/1E4 hrs. | % Creep @ 25° C.: 66 psi 1/100/1e4 hrs. | % Creep @ 55° C.: 25 psi 1/100/1e4 hrs. | % Creep @ 55° C.: 66 psi 1/100/1e4 hrs. |
|---|---|---|---|---|---|---|
| C1 | 3550/530 | 810/765 | | | | |
| C2 | 3550/455 | 90/90 | | | | |
| C3 | 4730/360 | 280/810 | | | | |
| C4 | 4000/360 | melted | | | | |
| C5 | | | .38/.84/— | 1.02/2.20/— | 3.26/—/— | 8.58/—/— |
| C6 | | | .32/.68/1.08 | .86/1.62/3.14 | 2.58/3.86/— | 6.82/10.12/— |
| C7 | 5025/310 | 20/1230 | | | | |
| 1 | | | | | | |
| 2 | 4390/420 | 305/450 | | | | |
| 3 | 3815/425 | 305/485 | | | | |
| 4 | | | | | | |
| 5 | 3735/430 | 265/470* | .26/.46/.68 | .68/1.20/1.82 | 1.16/1.48/1.88 | 3.04/3.90/4.98 |
| 6 | 4085/375 | 53/405* | .30/.54/.96 | .80/1.44/2.56 | 1.86/2.76/3.96 | 4.90/7.28/10.46 |

Tb is Tensile Strength @ break (psi). Eb is % Elongation (Strain) @ break, at temperature stated. (*measured @ 100° C.)
Shear Creep, at the temperature and pressure indicated, after 1,100 and 10,000 hours.
Measurements not made where no data shown.

TABLE 4

RHEOLOGICAL CHARACTERISTICS

Viscosity in Pa. Sec. @ temperature (°C.) and Shear Rate (sec-1) shown

| Ex. # | 190/20 | /400 | /600 | /1000 | 220/20 | /400 | /600 | /1000 | 240/20 | /400 | /600 | /1000 |
|---|---|---|---|---|---|---|---|---|---|---|---|---|
| C1 | | | | | | | | | | | | |
| C2 | | | | | | | | | | | | |
| C3 | | | | | | | | | | | | |
| C4 | | | | | | | | | 229 | 160 | 143 | 120 |
| C5 | | | | | | | | | | | | |
| C6 | 1963 | 645 | 529 | 405 | 971 | 356 | 295 | 232 | 587 | 245 | 210 | 168 |
| C7 | | | | | | | | | | | | |
| 1 | | | | | | | | | | | | |
| 2 | | | | | 914 | 328 | 273 | 213 | | | | |
| 3 | 2295 | 628 | 502 | 364 | 1070 | 359 | 296 | 227 | 582 | 236 | 198 | 156 |
| 4 | 2050 | 503 | 396 | 288 | 1085 | 327 | 266 | 197 | 717 | 239 | 198 | 154 |
| 5 | | | | | | | | | | | | |
| 6 | | | | | | | | | | | | |

Measurements not made where no data shown.

TABLE 5

SNAKE FLOW BEHAVIOR

Flow in inches @ Mold temperature (°C.) shown, under Barrel Conditions and Pressure indicated in key below

| Ex. # | B1/p1/40 | /p1/60 | /p2/40 | /p2/60 | /p3/40 | /p3/60 | B2/p1/40 | /p1/60 | /p2/40 | /p2/60 | /p3/40 | /p3/60 |
|---|---|---|---|---|---|---|---|---|---|---|---|---|
| C1 | | | | | | | | | | | | |
| C12 | | | | | | | | | | | | |
| C3 | | | | | | | | | | | | |
| C4 | | | | | | | | | | | | |
| C5 | 6.75 | nm | 12.0 | nm | 15.87 | nm | 11.75 | nm | 18.25 | nm | 23.5 | nm |
| C6 | 5.50 | nm | 11.75 | nm | 17.75 | nm | 9.50 | nm | 16.75 | nm | 22.0 | nm |
| C7 | 4.0 | nm | 8.25 | nm | 11.25 | nm | 6.5 | nm | 11.5 | nm | 14.75 | nm |
| 1 | | | | | | | | | | | | |
| 2 | | | | | | | | | | | | |
| 3 | 6.75 | 7.25 | 12.13 | 13.00 | 17.25 | 18.5 | 9.0 | 10.0 | 17.5 | 18.25 | 23.25 | 26 |
| 4 | 6.0 | 6.0 | 12.5 | 12.87 | 18.25 | 18.75 | 8.75 | 9.25 | 16.25 | 20.5 | 20.5 | nm |
| 5 | | | | | | | | | | | | |
| 6 | | | | | | | | | | | | |

B1 Barrel Set Temperature Zones: Zone 1 100° C.; Zone 2 190° C.; Zone 3 190° C.; Zone 4 190° C.
B2 Barrel Set Temperature Zones: Zone 1 100° C.; Zone 2 220° C.; Zone 3 220° C.; Zone 4 220° C.
Pressures: p1: 5000 psi; p2: 10000 psi; p3: 15000 psi.
Measurements not made where no data shown.
nm-not measurable because of parts sticking at sprue

I claim:

1. An ionomer composition, comprising a blend of:
   a) 30–80 weight percent, based on the combined weight of a) plus b), of a first ethylene/carboxylic acid copolymer having from 3 to 13 weight percent acrylic or methacrylic acid, prepared at a polymerization temperature of below 200° C. and a polymerization pressure greater than 23,000 psi the copolymer having a defined DSC melting point of above 100° C., and an MI of from about 0.5 to 60 g/10 min, and
   b) 70 to 20 weight percent, based on the combined weight of a) plus b), of an ionomer which is prepared from a second ethylene/carboxylic acid copolymer having from 9 to 25 weight percent of acrylic or methacrylic acid, and optionally up to 40 weight percent of an alkyl acrylate with a C1 to C8 alkyl group, prepared at a polymerization temperature of greater than 200° C., and a polymerization pressure of greater than 23,000 psi, the second acid copolymer having an MI of from 80 to 300, the ionomer prepared by partially neutralizing from above about 40 to about 80 percent of the acid groups with zinc, sodium, lithium, magnesium ions or a combination of any such ions, the resulting ionomer having an MI of from about 3.0 to about 7.0 g/10 min, the level of neutralization of all acid groups in the blend composition being at least 25 percent, and the MI of the blend being from about 1.5 to about 7.0 g/10 min.

2. The composition of claim 1 wherein the first ethylene/carboxylic acid copolymer has less than 8 weight percent acrylic or methacrylic acid, is prepared at a polymerization temperature below 190° C., and has an MI of less than 30 g/10 rain, and is present in the blend at a level of at least 40 weight percent.

3. The composition of claim 1 wherein the second ethylene/carboxylic acid copolymer is a dipolymer which has from 12 to 20 weight percent acrylic or methacrylic acid, its MI is from 100 to 250 g/10 min, and its neutralization level is above 45 percent.

4. The composition of claim 2 wherein the acid in the first ethylene/carboxylic acid copolymer is acrylic acid and the copolymer has an MI of less than 8 g/10 min, the second ethylene/carboxylic acid copolymer is a dipolymer which has from 12 to 20 weight percent acrylic or methacrylic acid, its MI is from 100 to 250 g/10 min, and its neutralization level is at least 50 percent.

5. The composition of claim 1 wherein the first ethylene/carboxylic acid copolymer is partially neutralized prior to blending with the ionomer derived from the second acid copolymer.

6. An ionomer composition, comprising a blend of:
   a) 30–80 weight percent, based on the combined weght of a) plus b) of a first ethylene/carboxlylic acid copolymer having from 3 to 13 weight percent acrylic or methacrylic acid, prepared at a polymerization temperature of below 200° C. and a polymerization pressure of greater than 23,000 psi, the copolymer having a defined DSC melting point of above 100° C., and an MI of from about 0.5 to 60 g/10 min, and
   b) 70 to 20 weight percent, based on the combined weight of a) plus b), of a second acid copolymer having from 9 to 25 weight percent of acrylic or methacrylic acid, and optionally up to 40 weight percent of an alkyl acrylate with a C1–C8 alkyl group, prepared at a polymerization temperature of greater than 200° C. and a polymerization pressure of greater than 23,000 psi, the second acid copolymer having an MI of 80 to 300 g/10 min, the blend of a) and b) being partially neutralized during melt blending, or in a subsequent melt step, with zinc, sodium, lithium, magnesium ions or a combination of any such ions, the resulting ionomer composition having at least 25 percent of the total acid groups of the acid copolymers neutralized, the MI of the blend being from about 1.5 to 7.0 g/10 min.

7. The ionomer composition of claim 6 where the neutralization of the acid copolymers is carried out during their melt blending.

* * * * *